United States Patent [19]

Mellor

[11] 4,357,249

[45] Nov. 2, 1982

[54] SELF-LUBRICATING BEARING AND THE LIKE, AND METHOD OF MAKING SAME

[75] Inventor: H. Clay Mellor, Wilmington, Del.

[73] Assignee: Arguto, Inc., Aston, Pa.

[21] Appl. No.: 186,312

[22] Filed: Sep. 11, 1980

[51] Int. Cl.$^3$ ............................................. C10M 5/10
[52] U.S. Cl. ................... 252/12; 252/12.2; 252/12.4; 252/12.6; 308/240
[58] Field of Search ............ 252/12, 12.2, 12.4, 252/12.6; 308/240

[56] References Cited

U.S. PATENT DOCUMENTS

| | | | |
|---|---|---|---|
| 2,246,092 | 6/1941 | Gilman | 308/238 |
| 2,691,647 | 10/1954 | Field et al. | 260/88.1 |
| 3,114,708 | 12/1963 | Morway et al. | 252/12 |
| 3,541,011 | 11/1970 | Davis et al. | 252/12 |
| 3,547,819 | 12/1970 | Davis et al. | 252/12 |

FOREIGN PATENT DOCUMENTS 2018820 10/1979 United Kingdom ............... 252/12.2

*Primary Examiner*—Jacqueline V. Howard
*Attorney, Agent, or Firm*—Howson and Howson

[57] ABSTRACT

Self-lubricating bearings, such as journal-type bearings are obtained by molding under pressure at elevated temperatures a substantially homogeneous blend of from about 70 to 95% of an ultra high molecular weight ethylene polymer and from about 5 to 30% of a normally solid lubricant which can be a wax, fat or mixtures thereof, or a mixture of either or both of these lubricants with a grease. The bearings exhibit excellent dimensional stability, good wear resistance, and a surface which is not oily to the touch. The bearings are self-lubricating, slowly releasing lubricant at temperatures developed in ordinary use.

25 Claims, No Drawings

SELF-LUBRICATING BEARING AND THE LIKE, AND METHOD OF MAKING SAME

FIELD OF THE INVENTION

The present invention relates to self-lubricating type bearings, such as journal bearings, and to novel compositions and methods for preparing same. More particularly, the present invention relates to structurally rigid, and dimensionally stable lubricant-filled articles, such as bearings, which resist undesirable loss of lubricant during storage, even at elevated temperatures, but which slowly release lubricant in use to provide desired lubrication, and to methods of manufacturing such articles.

BACKGROUND OF THE INVENTION

So-called self-lubricating bearings have been known for many years. Typically, they comprise a rigid matrix in which solid or liquid lubricants are impregnated, admixed or alloyed to provide the desired degree of lubricity. Such self-lubricating bearings have been formed of sintered bronze, sintered iron, hydrocarbon-impregnated wood, and various plastic materials, such as polytetrafluoroethylene, and ultra high molecular weight (UHMW) ethylene polymers which may contain a lubricating oil. See e.g. U.S. Pat. No. 3,541,011.

Bearings fabricated entirely of UHMW polyethylene have certain limitations. For instance, the coefficient of friction of such material in contact with a rotating conventional steel shaft is about 0.25. This is about double the coefficient of friction of a lubricant-impregnated wood or an oil impregnated sintered bronze bearing. Moreover, bearings of UHMW polyethylene tend to have about one fourth of the PV (product of load x velocity) value of lubricant impregnated wood and about one sixth the PV value of oil impregnated sintered bronze bearings. As known in the bearing art, a PV value is a means of ranking bearing materials using identical test specimens and conditions. Further reference to this method appears below.

Prior to the present invention, a number of efforts have been made to fill or impregnate various plastics with fluid lubricants, such as turbine oil, but such efforts generally have been unsuccessful because the lubricant has seeped from the molded plastic at relatively high rates, even when the molded part, e.g. a bearing, was not under stress. Unlike porous metals, rapid seepage of lubricant from a plastic bearing results in dimensional changes, such dimensional instability having prevented acceptance of such plastic bearings in self-lubricating bearing applications.

To demonstrate the problem of the proclivity of hydrocarbon oil-impregnated UHMW polyethylene to shrink, a bearing was fabricated from a molded cylindrical bar comprising 80% by weight of UHMW polyethylene impregnated with 20% of a turbine oil. The bar had a 1.058 in. mean outside diameter and was cut to length and bored to provide a cylindrical journal bearing. The UHMW polyethylene had a nominal average molecular weight of $3.5 \times 10^6$, and is sold under the trade designation GUR by the American Hoescht Company. The turbine oil had a viscosity of 150-160 SUS at 100° F., and is sold by E. F. Houghton and Company under the trade designation HYDRODRIVE MIH LIGHT. The aforementioned cylindrical bar was molded from a mixture of the oil and UHMW polyethylene powder, using a pressure of 1200 psi and a temperature of 390° F. The bar was then machined to a nominal outside diameter of 1.3805 in., was bored to a nominal inside diameter of 1.0075 in., and then cut to a nominal length of 1.007 in. to provide a cylindrical journal bearing. The thus produced bearing had a weight of 10.8 grams. After having been subjected to ambient room temperatures and moisture conditions for approximately 600 hours, the journal bearing was again measured and weighed. It was found that the outside diameter of the bearing had shrunk to 1.368 in., the inside diameter had shrunk to 0.997 in., and the length had shrunk to 1.0015 in. The journal bearing weighed 10.6 grams. In view of these changes in dimensions of the journal bearing, and particularly the shrinkage of the inside diameter, it would seize the shaft, and thus would be unsatisfactory as a bearing.

OBJECTS OF THE INVENTION

With the foregoing in mind, a primary object of the present invention is to provide a novel composition of matter which finds particular utility in being molded into structural units, such as self-lubricating bearings, where low friction, dimensional stability and wear resistance are essential properties.

It is another object of the present invention to provide novel, self-lubricating bearings which are characterized by low coefficients of friction and high PV levels.

A further object of the present invention is to provide improved self-lubricating plastic bearings which provide an effective boundary film of lubricating fluid, the lubricant being released at a controlled rate even under severe operating conditions to maintain the dimensional stability of the bearings.

A still further object of the present invention is to provide a unique molded plastic bearing which is not only dimensionally stable, but also wear-resistant.

Yet another object of the present invention is to provide a novel method for manufacturing a composition which is particularly suited for being molded into self-lubricating bearings.

These and other objects of this invention will become further apparent from the following description and appended claims.

SUMMARY OF THE INVENTION

More specifically, the present invention relates to a novel composition which finds particular utility in being molded into structural members having a low coefficient of sliding friction, dimensional stability, and exhibiting resistance to wear, such members finding particular utility in rotary sliding bearing applications. The composition comprises a substantially homogeneous blend of a substantially linear ultra high molecular weight ethylene polymer, and a normally solid lubricant selected from the group consisting of waxes, fats and mixtures thereof, and mixtures of one or both thereof with a grease. Generally the composition will comprise from about 70% to about 95% of polymer and 5 to 30% of lubricant, the percentages being by weight based on the total weight of the composition. In a preferred embodiment, the composition contains as the normally solid lubricant a blend of lubricants, namely a paraffin wax, stearin and a white oil grease. Most preferably, the UHMW polyethylene comprises about 80% by weight of the composition and the aforesaid lubricant blend about 20%.

In preparing the compositions of the present invention, the lubricant is heated to a temperature in excess of the melting point thereof, e.g. about 160° F., the powdered UHMW ethylene powder is heated to a temperature at least as great as the melting temperature of the lubricant but less than the melting point of the polyethylene (e.g. in a range of about 170°–200° F.) and while the powdered resin is being stirred, the molten lubricant is admixed therewith to form a homogeneous blend. Upon cooling to room temperature, the thus-formed blend is a powder which can be stored for prolonged periods without caking, but which can be subsequently molded to the desired shape at a temperature of about 400° F.±20° F. and at a pressure in a range of about 1,000–1,500 psi. Upon removal from the mold and cooling, the shape is a rigid solid capable of being machined into a desired configuration, such as a journal bearing, which has excellent dimensional stability, lubricity, and wear resistance. The molded article is characterized so that to the touch the surface appears to be substantially free from an oil-like film, yet in use provides a lubricating film by slow controlled release of lubricant.

DESCRIPTION OF PREFERRED EMBODIMENTS

In the design of self-lubricating bearings, certain considerations which are of great importance are: the coefficient of friction, the wear rate, the dimensional stability of the bearing and the bearing's ability to handle the required speeds and loads. While some bearing materials may have certain desirable properties, it is the rare bearing material which meets all of these criteria.

In recent years, ultra high molecular weight (UHMW) ethylene polymers have been used advantageously in many bearing applications. By the term "ultra high molecular weight ethylene polymers" as used in this specification and appended claims is meant those polymers of ethylene having an average molecular weight over about $1\times10^6$ and as high as $5\times10^6$. These polymers have a melt index between 0.00 and less than about 0.1 as measured by ASTM D-1238-62T.

The ultra high molecular weight polyethylenes, which are largely linear, can be prepared by conventional methods such as that using Ziegler catalysts as described in the *Encyclopedia of Chemical Technology,* 2d (1967) Vol. 14, pages 259–278.

UHMW polyethylene has a good coefficient of friction in sliding contact with shafts of 16 microinch finish 1045 carbon steel, excellent dimensional stability, and a good wear rate. However, there is an ever present demand for bearing materials which have even lower coefficients of friction, since a material which provides a substantial reduction in friction has the potential for saving substantial amounts of energy, and provides better wear rates.

The present invention provides novel compositions which are particularly suited for fabricating self-lubricating bearings. As used hereinafter, the term "bearing" is intended to include not only rotary or journal-type bearings, but also linear bearings. Of course, the compositions of the present invention may be useful in providing molded members for use in any application where there is a need for low friction between engaging parts moving relative to one another.

In bearing design, a factor designated "PV" has been developed as a measure of the capacity of a bearing to carry loads at different speeds, where "P" represents the bearing load, and "V" represents the relative speed between a shaft and a journal bearing. P is expressed in pounds per square inch of the projected area of the bearing, and mathematically, P equals the total load in pounds divided by the product of the length and diameter of the bearing. V is expressed in feet per minute at the interface between the shaft and bearing. Mathematically, V equals the product of pi multiplied by the diameter of the shaft in inches and its rotational speed in rpms, divided by 12.

As a general rule, sliding-type bearing materials have a capacity to accept either a high speed at a low load or a high load at a low speed. In other words, the product of $P\times V$ tends to be a constant for a given bearing material. The PV factor is, therefore, a reliable standard with which to compare various bearing materials.

Bearings of UHMW polyethylene can be used in small bearing applications where maximum PV levels are between 2000 and 3000 psi-fpm. Under these conditions, the coefficient of friction can be as high as 0.30, and the wear rate may reach $29\times10^{-10}$ in.$^3$-minutes/lb.-ft.-hour. As will be discussed, bearings having the composition of this invention will have coefficients of friction less than about 0.1, PV levels in excess of 10,000, dimensional stability such that a bearing having an ID of 1 in., on standing at ambient temperatures does not evidence a change in the dimension of the ID exceeding about $-0.004$ in. The novel bearings also have remarkably low wear rates. Bearings having the most preferred compositions of the present invention function satisfactorily at PV values of 50,000 psi-fpm at coefficients of friction as low as about 0.02, with wear rates as little as $7.9\times10^{-10}$.

The present invention provides compositions comprising an UHMW ethylene polymer and a normally solid lubricant which is at least extremely viscous at room temperature but which becomes fluid at moderately elevated temperatures within a range lower than the temperature at which the polymer softens. After the compositions are molded or extruded into a rod or tubular shape by the application of heat and pressure, a rigid, form-maintaining structure is produced having a surface which, to the touch, is substantially free from an oil-like film. The resulting structure is dimensionally stable, not only under ambient conditions of temperature and humidity, but also at elevated temperatures. However, in use the bearings release lubricant at a slow, controlled rate to provide low coefficients of friction, high PV values and low wear rates. Thus, the bearings find particular utility in self-lubricating applications.

The matrix of the novel compositions and structural members molded therefrom is a UHMW ethylene polymer. As noted above, such polymers have an average molecular weight of from over $1\times10^6$ to about $5\times10^6$. Preferred polymers have a molecular weight in the range of from about $1.5\times10^6$ to about $3.5\times10^6$. These polymers are generally in the form of finely divided solids.

The UHMW ethylene polymer constitutes between about 70% and about 95% of the weight of the composition. Preferably, the composition comprises about 80% of UHMW polyethylene. The percentages are by weight, based on the weight of the total composition before processing as described hereinafter. As will become apparent, this preferred amount of UHMW polymer, when combined with the preferred lubricant, provides an outstanding bearing material.

The balance of the weight composition, i.e. about 5% to about 30%, comprises a normally solid lubricant. By the term "normally solid" is meant that the lubricant is substantially form-maintaining at room temperature, whether or not the lubricant comprises a single material, such as wax, or is a combination of materials, e.g. a mixture of wax, a fat, and a grease. By "form-maintaining" is meant that the lubricant at room temperature may vary in consistency from an extremely viscous substance to a rigid solid. Upon heating the lubricant to elevated temperatures above 100° F., but below the softening point of the polymer, which is about 240° F., the lubricant becomes sufficiently fluid to be intimately mixed with the polymer particles to form a uniform blend, yet upon cooling to ambient temperatures, the polymer and lubricant, or components of the lubricant do not become segregated. For example, if the lubricant comprises in part a grease, it is important that upon heating and cooling of the lubricant, the oil in the grease does not separate. Preferably, the lubricants become liquid upon being heated to temperatures on the order of 140° to about 160° F.

The lubricants employed in the present invention comprise certain waxes and fats and mixtures thereof, which materials, either alone or as a mixture of the two, may be combined with certain greases.

The term "wax" as used herein refers to any plastic, amorphous mass of animal, vegetable, mineral or synthetic origin which becomes fluid at temperatures above about 100° F. The waxes are plastic solids that have cold-flow yield values within the force range practical for manual working at room temperature, and have hydrophobic or water-repellent properties. The natural waxes, i.e. the animal, including insect, and vegetable waxes are long-chain fatty alcohols and acids whereas those of mineral or petroleum origin consist essentially of hydrocarbons.

Typical of the natural waxes of animal or vegetable origin which may be used as the normally solid lubricant in the compositions of this invention are beeswax, bayberry-myrtle, candelilla, caranday, carnuba, castor bean wax, esparto grass wax, Japan wax, mountain crude wax, ouricury, tetamo-ceri nimbi, shellac wax, spermacetti, wool waxlanolin and the like. A preferred natural wax is carnuba wax.

Mineral waxes are preferably those of petroleum origin such as paraffin wax, microcrystalline wax, motor oil wax, residual wax and tank bottom wax. The preferred wax is a paraffin wax having a melting point on the order of 120°–140° F. Typically commerically available petroleum waxes are Mobil Wax Nos. 130 and 140 sold by Mobil Oil Company, and Boler No. 1461 sold by the Boler Petroleum Company. The properties of these commercial waxes are set forth in Table I, below:

TABLE I

| Typical Characteristics | Mobil 130 | Mobil 140 | Boler |
|---|---|---|---|
| Color | +28 Saybolt | +30 Saybolt | Light Brown |
| Viscosity at 210° F., SUS | 39 | 41 | 37/39 |
| Melting Point °F. ASTM | 131 | 141 | 128/132 |
| Blocking Point °F. | 100 | 110 | |
| Flash Point °F. COC | 430 | 450 | |
| Oil Content % by wt. | 0.3 | 0.3 | 1.0 |

The fats suitable for use as lubricants in the compositions of the present invention may be those derived from animal origin, an example of which is stearin obtained by rendering choice internal fats of cattle or sheep followed by separation of the oleo oil (see *Encyclopedia of Chemical Technology*, 2d (1967), Vol. 13, page 182). A commercially available stearin is sold by Armour Foods Company under the trade name Armour Code S-0002, and another is sold by Acme-Hardesty Company, Inc., under the trade name technical Oleo Stearin TOS. These commercial products comprise 100% food grade tallow having a 130°–140° F. melting point.

Any of the common greases such as Grades 2, 3, and 4 may be used in the compositions of this invention. Generally, lower grade greases are not as effective since the oil therein may tend to bleed therefrom and consequently from bearings made in accordance with the teachings of this invention, even under ambient conditions. Such bleeding results in dimensional changes of the bearings of such magnitude as to cause the bearings to seize the axle rotating therein. However, by using greases of Grade 2 and higher, such bleeding can be avoided.

The grease can comprise any natural or synthetic lubricating oil thickened by such well known thickeners as salts, soaps, soap-salt or mixed salt complexes, polymeric thickeners such as polymers of $C_2$ to $C_4$, monoolefins of 10,000 to 50,000 molecular weight such as polyethylene or polypropylene, and inorganic thickeners (e.g. clay, carbon black, silica gel, etc.).

Generally the greases will comprise either a synthetic or mineral lubricating oil thickened with about 3 to 35% by weight of a thickener. Preferably the oil is a low viscosity oil having a viscosity on the order of 300 to 800 SUS at 100° F., for greases containing such an oil provide the bearings of this invention with the lowest coefficients of friction. A particularly preferred grease is a white oil grease, commercial examples of which are one sold by the Keystone division of Pennwalt Corporation under the trade designation Nevastone ® Medium Grease and another sold by Plough Company under the trade name Nujal. These greases are thickened with aluminum soaps and have a dropping point of about 225° F.

As stated previously, the normally solid lubricant comprises from about 5% to 30% by weight of the composition (and bearings) of this invention. Particularly preferred compositions comprise about 80% polymer and 20% lubricant, where the lubricant comprises a mixture of a wax, a fat, and a grease. In such lubricant mixtures the wax may comprise from about 30% to about 60%, and each of the fat and the grease from about 10% to about 40%, said percentages being by weight based on the total weight of the mixture of lubricants. A particularly preferred lubricant comprises 46% paraffin wax, 27% stearin and 27% white oil grease.

In producing the compositions of the present invention, the UHMW polyethylene powder is heated to a temperature which is higher than the melting temperature of the lubricant or blend of lubricants, but below the temperature at which the polymer begins to soften. For example, the UHMW polyethylene may be heated to a temperature in a range of about 170° F. to about 200° F. in a vessel surrounded by water or air. This can be accomplished for example by stirring the polymer in a high intensity mixer such as that manufactured by Henshel. The intensity of the motion within the vessel raises the temperature of UHMW polyethylene powder to the desired level, a water jacket around the vessel being used for cooling to maintain proper temperature control. The lubricant or blend of lubricants is heated to a temperature above the melting point to form a liquid, generally on the order of about 160° F., and the liquid lubricant is slowly admixed with the powdered polymer with constant stirring. After the lubricant and resin have been thoroughly mixed, which generally takes about 5 minutes, the composition is allowed to cool to room temperature. More rapid cooling can be achieved by depositing the composition in a cooler while maintaining a gentle stirring action. The resulting composition is a homogeneous powder which does not have a tendency to cake, and can be stored or shipped in bags or containers and yet remains in a state suitable for subsequent processing, including molding or extrusion.

While a batch process for preparing compositions of this invention has been disclosed, it should be apparent that the process of the present invention can be carried out on a continuous basis, if desired. Moreover, while the compositions are permitted to cool to ambient temperatures, it should be apparent that such step may not be necessary if the composition is to be utilized immediately as by being molded into structural shapes in the same plant where the compositions are mixed. In such event, after blending, it would simply be necessary to heat the resulting composition to a temperature sufficient to melt the same and to apply a molding pressure of appropriate magnitude. It has been found that by heating the composition to a temperature of about 400° F. ±20° F. and applying pressures in a range of about 1,000 psi to about 1,500 psi a very satisfactory solid product is obtained upon cooling to ambient temperatures. The resulting solid may then be milled or machined into whatever structural shape may be desired for any particular application.

The following specific examples are intended to illustrate the advantages of the compositions and bearings of this invention, but it is not intended that the invention be limited to the specific embodiments described therein.

In the several specific examples, unless otherwise indicated, journal bearings were prepared by heating the lubricant or lubricant blend to a temperature sufficiently high to render the lubricant fluid. The UHMW ethylene polymer used had an average molecular weight of about $3.5 \times 10^6$, and the polymer was also heated to a temperature of about 170° to 200° F. under a pressure of about 1200 psi. The rod was subsequently cut to length and bored to produce journal bearings which were tested as described hereinbelow.

EXAMPLE I

This example demonstrates the unexpected properties of a journal bearing formed of a preferred composition of the present invention, as contrasted with conventional self-lubricating bearings. The bearing tested had a composition which comprised 80% by weight UHMW polyethylene and 20% of a blend of lubricants, the blend consisting of 45.6%, by weight, of a paraffin wax, 25.7% stearin and 25.7% white oil grease. The bearing, which was fabricated as described above, had a length of 0.9975 in. and an inside diameter of 1.0110 in. After standing for three weeks under ambient conditions of temperature and humidity, the change in the dimension of the ID was only +0.0015 in.

A carbon steel shaft having a 16 microinch finish was used in the test, and the shaft was rotated at 382 rpm, thereby providing a surface speed of 100 fpm. The three different bearings were tested on the Arguto "Simulife" bearing testing machine, made by Arguto, Inc. Basically the test machine consists of two 1 in. diameter shafts which are driven by an electric motor through a variable speed drive to give shaft speeds from 50 to 1000 ft./min. The bearings to be tested are pressed into retaining rings which are inserted in the bearing support arms. Each bearing support arm is part of a parallelogram mounted on hardened knife edges. The bearing is loaded by means of a levered weight arm so that loads may be varied from zero to 1000 pounds.

Friction force is measured by strain gauges mounted on a torque arm and is recorded directly on one channel of a dual channel oscillograph. The bearing temperature is measured by means of a thermocouple buried in the loaded side of the bearing wall and recorded in the second channel of the oscillograph. The shaft speed is indicated directly on a tachometer. The test results are set forth below in Table II, in which the bearing of this invention is designated "DGB."

TABLE II

| Bearing | PV | Coefficient of Friction | Wear Rate (in$^3$-min/lb-ft-hr) |
|---|---|---|---|
| DGB | 50,000 | .02 | $7.9 \times 10^{-10}$ |
| Lubricant-Impregnated Wood | 10,000 | .11 | $4.5 \times 10^{-10}$ |
| Virgin UHMW Polyethylene | 2,500 | .32 | $29 \times 10^{-10}$ |

From Table II, it may be seen that the DGB bearing had a coefficient of friction which was less than 1/5th the coefficient of friction of a typical lubricant-impregnated wood bearing, and about 1/15th the coefficient of friction of the virgin UHMW polyethylene bearing. The wear rate for the DGB bearing was less than double than the wear rate for the lubricant-impregnated wood despite a four-fold increase in PV value, and still was less than ⅛ the wear rate of the virgin UHMW polyethylene bearing, even at 20 times the PV. The DGB bearing showed greater than a 70X better performance than that of the bearing formed entirely of the polymer, which polymer was the same as that used in the DGB bearing.

EXAMPLE II

This example further demonstrates the superior performance obtainable by bearings made in accordance with the present invention. One bearing had a composition comprising 85% UHMW polyethylene and 15% of the lubricant blend of Example I, another had a composition comprising 95% UHMW polyethylene and 5% of the same lubricant blend, a third had a composition comprising 80% UHMW polyethylene and 20% of the aforesaid lubricant blend, and a fourth had a composition comprising 70% UHMW polyethylene and 30% of the lubricant blend. The four bearings, which had similar dimensions to the bearing of Example I, were tested under conditions identical to those of Example I. The results are set forth below in Table III.

TABLE III

| Bearing Composition* | PV | Coefficient of Friction | Wear Rate (in$^3$-min/lb-ft-hr) |
|---|---|---|---|
| 95/5 | 10,000 | .11 | $0.4 \times 10^{-10}$ |
| 85/15 | 10,000 | .06 | $1.4 \times 10^{-10}$ |
| 80/20 | 50,000 | .02 | $7.9 \times 10^{-10}$ |
| 70/30 | 10,000 | .07 | $15.0 \times 10^{-10}$ |

*The first number is the wt. % of polymer and the second is wt. % of lubricant.

From Table III, it may be seen that all four bearings exhibited extremely low coefficients of friction and low wear rates.

EXAMPLE III

In order to demonstrate further the effect of changes in the proportions of lubricant and UHMW polyethylene in bearings made in accordance with the teachings of this invention, additional bearings were made as described in Example I, above. In the present example, however, the journal bearings had a length of ½ in. and an internal diameter of ½ in. The lubricant blend of Example I was employed in the bearings, the weight percent of UHMW ethylene and lubricant in the bearings being, respectively, 70/30, 80/20 and 85/15. The shaft used in the test was 1045 carbon steel having a 16 microinch finish. The shaft speed was set at either 760 or 1750 rpms. The results of the test are set forth below in Table IV.

TABLE IV

| Bearing Composition | PV (FPM) | Total Hours | Coefficient of Friction | Wear Rate (in$^3$-min/ lb-ft-hr.) |
|---|---|---|---|---|
| 80/20 | 10,000 (230) | 598 | .14 | 6.7 × 10$^{-10}$ |
| 70/30 | 10,000 (230) | 383 | .05 | 8.9 × 10$^{-10}$ |
| 85/15 | 10,000 (100) | 390 | .11 | 6.8 × 10$^{-10}$ |
| 70/30 | 10,000 (100) | 402 | .07 | 10.0 × 10$^{-10}$ |

As seen by reference to Table IV, even at PV values of 10,000 the bearings evidenced low coefficients of friction and low wear rates.

EXAMPLE IV

Further tests were conducted on bearings of this invention, prepared in the same manner as and having the same dimensions as the bearings of Example I. The composition of one of the bearings was 85% polymer and 15% of the lubricant blend of Example I, whereas that of the other was 70% polymer and 30% lubricant blend. The purpose of the tests was to determine the change of coefficient of friction and total wear at different PV values. The bearing, shaft and test conditions were as set forth in Example I. The bearings were run-in at 10,000 psi-fpm for a period of 140–150 hours. Loading was thereafter increased at 45 minute intervals from 100 psi to 200, 300, 350, 400 and 475 psi, the 475 psi test being run at 105 feet per minute for a PV value of 50,000. After the 475 psi 105 fpm level was reached, the test was continued for an additional 50 hours. The results of the test are set forth in Table V.

TABLE V

| Bearing Composition | Coefficient of Friction | | | | | | Total Wear in. |
|---|---|---|---|---|---|---|---|
| | 10,000 PV | 20,000 PV | 30,000 PV | 35,000 PV | 40,000 PV | 50,000 PV | |
| 85/15 | .05 | .03 | .03 | .02 | .02 | .05 | .005 |
| 70/30 | .04 | .03 | .03 | .02 | .02 | .02 | .0075 |

As with most self-lubricating bearings, increasing load at constant speed produced a lowering of the coefficient of friction. Throughout this test program, direct comparison with other plastic bearings was not possible because such bearings are incapable of supporting PV levels in this range.

EXAMPLE V

The purpose of this example is to show the performance of bearings of this invention using different lubricants. The bearings were prepared and tested according to the procedures of example I, each bearing consisting of 80%, by weight, of UHMW polyethylene and 20% of the particular lubricant blend. The bearings had the compositions set forth in Table VI, below:

TABLE VI

| | Weight Percent* | | |
|---|---|---|---|
| Bearing | Paraffin Wax | Stearin | White Oil Grease |
| A | 45 | — | 55 |
| B | 45 | 55 | — |
| C | — | 50 | 50 |
| D | 46.6 | 26.7 | 26.7 |

*Based on total weight of lubricants.

The bearings gave the following coefficients of friction when tested at a PV of 10,000:

TABLE VII

| Bearing | Coefficient of Friction |
|---|---|
| A | 0.04 |
| B | 0.05 |
| C | 0.03 |
| D | 0.02 |

The data in Table VII show that bearings of this invention having different lubricants evidence extremely low coefficients of friction even at a PV value of 10,000.

EXAMPLE VI

Comparable specimens, one of pure UHMW polyethylene, a second of a sulfone polymer, a third of nylon, a fourth of a polyurethane resin, a fifth of phenolic resin, and a sixth having the composition of the bearing in Example I, were subjected to the sandbelt test, in which a belt of sandpaper is advanced horizontally along the underside of an annular sample which is fastened to the underside of a gear which is rotated about a vertical axis. Changes in the thickness of the sample are measured at the end of the test period, and the results are set forth in Table VIII, below:

TABLE VIII

| Test Sample | Wear Rate (in$^3$/min × 10$^{-3}$) |
|---|---|
| UHMW polyethylene | 5 |
| Example I Composition | 8 |
| Sulfone Polymer | 12 |
| Nylon | 14 |
| Polyurethane Resin | 18 |
| Phenolic Resin | 25 |

As can be seen by reference to the data set forth in Table VIII, with the exception of the UHMW polyethylene, the wear rate for the material of this invention (Example I composition) is less than that for the other samples tested. As to the UHMW polyethylene, the difference in wear rates is relatively insignificant considering the substantial improvement in performance for compositions of this invention, as noted in the previous examples.

EXAMPLE VII

Specimens of pure UHMW polyethylene, of the composition of the present invention, and of nylon, acetyl resin, and steel were subjected to the sand slurry test. In this test, a 3 in. by 1 in. flat rectangular specimen having a central hole is mounted adjacent the end of a vertically disposed rod which is connected at its upper end to an electric motor. The test specimen is immersed in a 50% sand-50% water slurry. The motor rotates the specimen in the slurry at a speed of 1750 rpm. The test was conducted over a period of 7½ hours, and the test results are given in Table IX, below:

TABLE IX

| Test Sample | Wear Rate ($in^3$/min $\times 10^{-3}$) |
|---|---|
| UHMW Polyethylene | 7 |
| Example I Composition | 24 |
| Nylon | 30 |
| Acetyl Resin | 97 |
| Carbon Steel | 100 |

In use, it has been found that the initial coefficient of friction of bearings having the composition of the present invention, in contact with a 1045 carbon steel shaft having a 16 microinch finish is about 0.20 to about 0.30, typical of the coefficient of friction for self-lubricating plastic materials. It is believed, however, that after a brief run-in period, in the bearings of this invention a lubricant film forms at the interface between the bearing and the shaft, causing the coefficient of friction to decrease rapidly and reach a steady state below about 0.1, depending upon operating conditions. Heretofore, such low values of coefficient of friction have generally been obtained only in bearings having external lubrication.

EXAMPLE VIII

A number of journal bearings which had the nominal dimensions of 1 in ID×1⅜ in. OD×1 in. long, were prepared as described in the several previous examples. The compositions of the several bearings are given in Table X, below:

TABLE X

| Sample Description | Composition* |
|---|---|
| 1 | Wax 33.3%, Stearin 33.3%, White Oil Grease 33.3% |
| 2 | Wax 100% |
| 3 | Stearin 100% |
| 4 | Wax** 46.6%, Stearin 26.8%, White Oil Grease 26.8% |

*All samples consisted of 80% UHMW polyethylene and 20% lubricant.
**Polyethylene wax The test bearings were measured after being machined and again after being subjected to ambient room conditions of temperature and humidity for more than 300 hours, and changes of dimensions were noted. The changes are recorded in Table XI, below:

TABLE XI

| Sample Designation | Dimensional Change (inches) | | |
|---|---|---|---|
| | OD | ID | Length |
| 1 | −0.0010 | +0.0010 | −0.0010 |
| 2 | −0.0070 | −0.0040/+0.0010 | +0.0110 |
| 3 | −0.0020 | −0.0020/+0.0045 | +0.0020 |
| 4 | +0.0010 | +0.0010 | +0.0005 |

The bearings were also tested on the Arguto "Simulife" test machine as described in Example I, using a load of 100 psi, and a surface speed of 100 fpm (10,000 PV). The results of the tests are given in Table XII, below:

TABLE XII

| Sample Designation | Bedding In Wear (inches) | Wear Rate After Bedding In ($in^3$-min/lb-ft-hr) | Coefficient of Friction |
|---|---|---|---|
| 1 | 0.0017 | $6 \times 10^{-10}$ | 0.03 |
| 2 | 0.0050 | $8 \times 10^{-10}$ | 0.08 |
| 3 | 0.0021 | $8.6 \times 10^{-10}$ | 0.06 |
| 4 | 0.0020 | $11.5 \times 10^{-10}$ | 0.06 |

Bearings having the preferred composition of the present invention, i.e. 80% polymer and 20% lubricant, the lubricant consisting of about 46% paraffin wax, 27% stearin and 27% white oil grease have an extremely low wear rate when compared with the bearings of other types of polymers. For instance, in the tests on bearings of the preferred composition at 10,000 PV/100 fpm, a wear rate of $0.2 \times 10^{-5}$ in/hr has been measured. Similar tests at 20,000 PV/400 fpm and at 50,000 PV/500 fpm have yielded wear rates of $1 \times 10^{-5}$ in/hr. All of these values are very small, and generally equivalent to the wear rate of the self-lubricating polytetrafluoroethylene (PTFE) bearings at 1/10th these PV values. Moreover, the coefficients of friction measured in these tests were 0.04/0.05 which is about 1/5th of the values generally obtained in comparable tests of PTFE bearings.

While some lubricant can be expected to be lost in the process of molding the composition of the present invention, it has been determined that such loss is generally less than about 1% of the weight of the total premolded composition.

In view of the foregoing, it should be apparent that the present invention now provides compositions from which structural members, such as bearings, can be fabricated, which members have characteristics rendering them particularly suited for use in applications where a low coefficient of friction, self-lubrication, wear resistance, dimensional stability, and structural strength are desirable qualities. Potential applications include: domestic appliances, office machines, textile machinery, farm equipment, conveyors, food machinery, printing presses and graphic arts equipment, pumps, fractional horsepower electric motors, and hardware. Certain linear bearing applications, i.e. applications wherein articles such as cans are conveyed on an elongated trackway, are particularly suitable for the compositions of the present invention.

While certain preferred embodiments of the present invention have been described in detail as has a preferred process for producing the composition, various modifications, alterations, and changes may be made both in the compositions and the process without departing from the spirit and scope of the present invention as defined by the appended claims.

What is claimed is:

1. A composition particularly suitable for being molded into structural members which are dimensionally stable and have a low coefficient of friction comprising a substantially homogeneous blend of from about 70% to about 95% of a substantially linear ultra high molecular weight ethylene polymer, and from about 5% to about 30% of a normally solid lubricant selected from the group consisting of waxes, fats and mixtures thereof, and mixtures of one or both of said lubricants with a grease, said percentages being by weight based on the total weight of the composition.

2. The composition according to claim 1 in which said ethylene polymer has an average molecular weight of from about $1.5 \times 10^6$ to about $3.5 \times 10^6$.

3. The composition according to claim 1 in which said lubricant comprises a paraffin wax.

4. The composition according to claim 1 in which said lubricant comprises stearin.

5. The composition according to claim 1 in which said lubricant comprises a mixture of a wax and a fat.

6. The composition according to claim 5 in which said wax comprises a paraffin wax and said fat comprises stearin.

7. The composition according to claim 1 in which said lubricant comprises a mixture of a wax, a fat and a grease.

8. The composition according to claim 7 in which said lubricant comprises from about 30% to about 60% wax, from about 10 to about 40% fat and from about 10 to about 40% grease, said percentages being by weight based on the total weight of the mixture of said lubricants.

9. The composition according to claim 1 comprising about 80% polymer and 20% normally solid lubricant, said lubricant comprising about 46% paraffin wax, about 27% stearin and about 27% white oil grease.

10. A structural member having dimensional stability and a low coefficient of friction in the form of a tough, rigid, solid body comprising from about 70% to about 95% of an ultra high molecular weight ethylene polymer having dispersed therein from about 5% to about 30% of a normally solid lubricant selected from the group consisting of waxes, fats and mixtures thereof, and mixtures of one or both of said lubricants with a grease, said percentages being by weight based on the total weight of said polymer and lubricant.

11. A structural member according to claim 10 in the form of a journal-type bearing.

12. A structural member according to claim 10 in which said ethylene polymer has a molecular weight of from about $1.5 \times 10^6$ to about $3.5 \times 10^6$.

13. A structural member according to claim 10 in which said lubricant comprises a paraffin wax.

14. A structural member according to claim 10 in which said lubricant comprises stearin.

15. A structural member according to claim 10 in which said lubricant comprises a mixture of a wax and a fat.

16. A structural member according to claim 15 in which said wax comprises a paraffin wax and said fat comprises stearin.

17. A structural member according to claim 10 in which said lubricant comprises a mixture of a wax, a fat and a grease.

18. A structural member according to claim 17 in which said lubricant comprises from about 30% to about 60% wax, from about 10% to about 40% fat and from about 10 to about 40% grease, said percentages being by weight based on the total weight of the mixture of said lubricants.

19. A structural member according to claim 18 comprising about 80% polymer and about 20% normally solid lubricant, said lubricant comprising about 46% paraffin wax, about 27% stearin and about 27% white oil grease.

20. A structural member according to claim 19 in the form of journal-type bearing.

21. A method of making a composition particularly suited for being molded into structural members which are dimensionally stable and have a low coefficient of friction comprising the steps of:
  (a) heating a normally solid lubricant selected from the group consisting of waxes, fats and mixtures thereof, and mixtures of one or both of said lubricants with a grease, to form a liquid,
  (b) heating a finely-divided ultra high molecular weight ethylene polymer to a temperature above the temperature of said liquid lubricant, but below the temperature at which said polymer softens,
  (c) mixing said lubricant and polymer together to form a homogeneous blend comprising from about 5% to about 30%, by weight, of said lubricant and from about 70% to about 95%, by weight, of said polymer, and
  (d) cooling said homogeneous blend to obtain a homogeneous powder suitable for molding structural members.

22. The method according to claim 21 wherein said lubricant is heated to a temperature of about 160° F., and said polymer is heated to a temperature in a range of about 170° F. to about 200° F. prior to combining said lubricant and said polymer.

23. The method according to claim 21 in which said blend comprises about 20%, by weight of said lubricant, and about 80% of said polymer.

24. The method according to claim 23 wherein said lubricant comprises a mixture of paraffin wax, stearin and a white oil grease, said wax constituting about 46%, by weight, of said lubricant mixture, the remainder of the mixture comprising about equal parts, by weight, of said stearin and white oil grease.

25. The method according to claim 21 including the step of heating said blend to a temperature from about 380° to about 420° F., and subjecting the composition to a pressure in a range of about 1000 psi to about 1500 psi for a time sufficient to produce, upon cooling a tough, rigid, dimensionally stable article having a low coefficient of friction and a surface substantially free from an oil-like film.

* * * * *